April 26, 1966    W. W. SCHROEDER, JR ETAL    3,247,570
WELDED CAPACITOR METHOD
Filed May 14, 1964
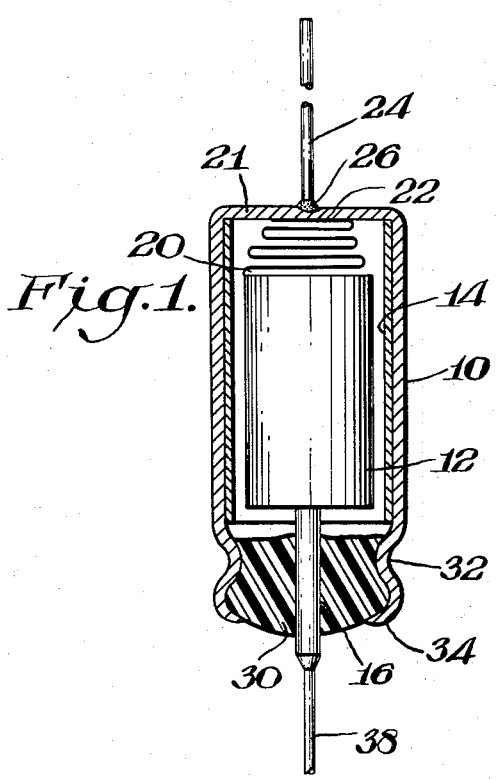
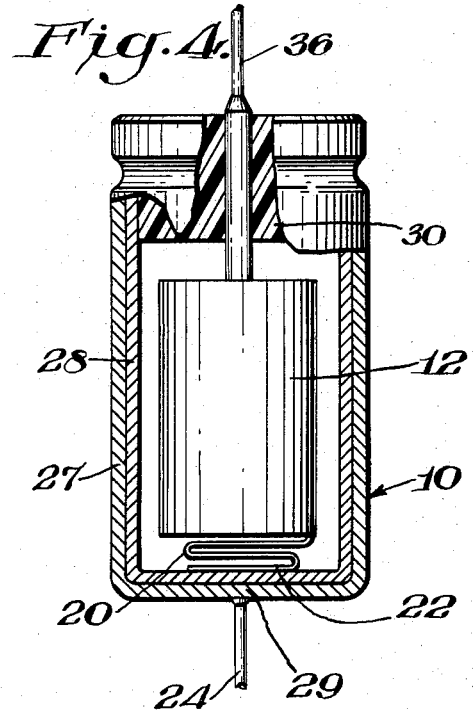
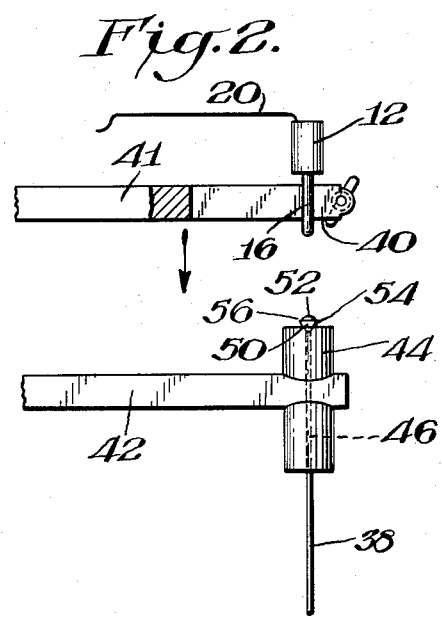
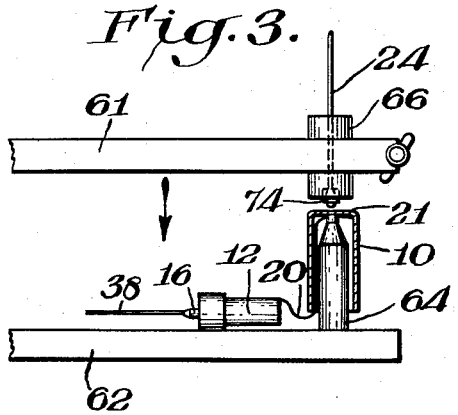
INVENTORS
*Walter W. Schroeder, Jr.*
*William A. Owczarski*
BY *Connolly and Hutz*
ATTORNEYS

3,247,570
WELDED CAPACITOR METHOD
Walter W. Schroeder, Jr., Williamstown, Mass., and William A. Owczarski, Cheshire, Conn.
Filed May 14, 1964, Ser. No. 367,510
1 Claim. (Cl. 29—25.42)

This application is a continuation-in-part of our parent application Serial No. 623,077 filed November 19, 1956, now abandoned.

This invention relates to a method of making wound-foil electrolytic capacitors, and more particularly to a method of producing all-welded miniature wound-foil electrolytic capacitors that are housed within metallic containers.

Prior art methods of assembling miniature wound-foil electrolytic capacitors have included the use of molded plastic containers, and the use of metallic containers with rivetted or pressure contacts between cathode and container. These prior art methods have not proven to be entirely satisfactory at low voltages where noise produced by unstable contacts is a severe problem.

It is an object of this invention to provide a method that overcomes these and other related disadvantages of the prior art.

It is another object of this invention to provide a method for producing a low voltage electrolytic capacitor having noise-free operation.

These and other objects of this invention will become apparent upon consideration of the following description taken together with the accompanying drawing, in which:

FIGURE 1 is a sectional view of a capacitor constructed in accordance with the method of this invention;

FIGURES 2 and 3 are elevational views partly in section illustrating steps in the method of this invention; and FIGURE 4 is a sectional view of another embodiment of a capacitor constructed in accordance with this invention.

Broadly, the objects of this invention are achieved by a method which includes the steps of first providing a wound-foil electrolytic capacitance section having a valve-metal tab extending from one foil, and then welding that tab to the inside of a metallic container while simultaneously welding a lead-wire to the outside of the container opposite the tab weld.

The capacitor produced by this invention has a pair of valve-metal foils which are convolutely wound with suitable spacers, such as porous paper. One of the foils is joined to a riser by a welding process, such as cold welding by clinching an end of the foil within a slot in the riser. The riser extends beyond one end of the capacitance section so as to facilitate sealing of the capacitor and attachment of an external lead-wire. The riser projects through a rubber grommet into which the can wall is crimped and rolled to provide an effective seal. The extended riser also functions as a winding mandrel during the rolling of the capacitance section. A valve-metal tab is attached to the other of the two foils, also by a welding operation, such as by staking together the tab and foil. The capacitor can is of material compatible with the electrolyte of the capacitance section. A portion of the tab is welded to the inner surface of the closed end of the capacitor can, as by capacitance discharge welding. An external lead-wire is secured to the external surface of the can opposite the tab weld by the same welding operation.

The make-up of capacitance section 12 with regard to the type of electrode foils and spacers which are wound together to form the capacitor is of the type described in the U.S. Patent 2,869,052 to O. A. Ness et al. issued January 13, 1959.

A valve-metal tab 20, such as aluminum, provides one terminal for capacitance section 12. Tab 20 is staked or otherwise welded to one of the foil electrodes of the section 12. The portion of tab 20 that extends beyond the end of capacitance section 12 is folded over with its outer end welded as at 22 to the inside surface of the can 10. An external lead-wire 24 for the can is welded in place at 26 directly opposite weld 22.

The lead-wires used in the above construction are desirably of tinned copper wire not more than about 1/32 inch thick. One end of the wire may be ball-shaped or hemispherical with an enlarged collar or flange extending about the ball and facing said end. The ball-shaped end permits point contact of the lead-wire to the outer surface of the closed end of can 10 to ensure localized heating during the welding operation. The flange permits securing and indexing of the lead-wire within an electrode of a welder. Straight wire without the ball and flange is likewise within the scope of this invention. We have found that by matching the current and pressure that is applied to the parts that are being welded, a straight wire can be butt-welded to both the riser and the can. So long as the two members that are being welded are made effectively the same size by the current and pressure matching procedure, the heat concentrating property of the ball-shaped end is not required.

Assembly of the above capacitors is accomplished by inserting only the tab from the capacitance section into the metal can, the can has one end closed and one end open and is a close fit for the unit, then welding a portion of the tab against the inner surface of the can while simultaneously welding the solderable lead to the outer surface of the can, then inserting the unit into the can thereby simultaneously folding up the welded tab, and then sealing the open end of the can.

The capacitor of FIGURE 1 includes a metal housing in the form of a can 10, of aluminum for example, in which is contained a capacitance section 12 of a convolutely wound assembly of foil and spacer elements. A protective liner 14 of paper or the like can be used to keep the can from undesired intermittent engagement with the section. Liner 14 may be omitted by attaching the tab 20 to the outer foil of the capacitance section, so as to maintain the outer foil at the same potential as the can. The welding of external lead 24 is preferably accomplished by the same welding operation that welds tab 20 to the inner surface of can 10.

The can is then sealed by a chemically inert resilient material such as natural or synthetic rubber bushing 30 which has a small passageway that allows it to be slipped tightly over riser 16. Very effective sealing is obtained by rolling the can wall into the bushing as at 32, and also spinning the mouth of the can down against it as at 34. By squeezing the bushing so as to reduce the diameter by about 25%, that is by at least about 5 to 20 mils around its periphery and a similar amount along a perpendicular direction (axially of the can), leak-proof constructions are readily obtained. For greater ease in making connections to the riser 16, lead 38 similar to that shown at 24 can be butt-welded to its end.

A feature of the present invention is that the capacitor of FIGURE 1 can be very readily manufactured. Where the capacitor is of the electrolytic kind, one of the foils has an in-situ formed oxide coating and the can is filled with an electrolyte, as described for example in U.S. Letters Patent 2,757,140, granted July 31, 1956, to F. H. Bush. As shown in FIGURE 2 for example, after the capacitor section 12 is wound and impregnated with electrolyte, it can have its riser 16 clamped in the split end 40 of a spot welding electrode 41. In a cooperating electrode 42 there is held a supporting block 44 apertured to receive lead-wire 38. One end of the lead-wire has an enlarged head 50 so that it is supported by the top of the block 44.

Very effective butt-welding is obtained in this way when the head 50 has a ball-shaped end 52 that stands out about 5 to 20 mils from a collar 54 having an over-all diameter substantially equal to that of the riser 16 and presents a flat surface 56 facing ball 52. In this way, the tail of lead-wire 38 need not be more than 1/32 of an inch thick, 20 mils or less is adequate, and yet the lead-wire will adhere very tenaciously to the butt end of riser 16 even though such risers, particularly those of split construction, are generally at least about 50 to 60 mils thick. Operation of the spot welding set-up of FIGURE 2 causes the ball 52 to merge and penetrate into the end of riser 16 so that when completed face 56 will rest against that end. This appears to help with the welding as well as increase the strength of the welded joint, particularly against flexing.

After the lead-wire 38 is welded in place, the grommet 30 is slipped over it and onto the riser 16, and the tab 20 then welded to the inside bottom surface 21 of can 10. This operation is illustrated in FIGURE 3 where there is shown another pair of spot welding electrodes 61 and 62. Electrode 62 carries an anvil-like support 64 which is dimensioned so that can 10 will slip over the end and rest with closed end 21 on top of the support and with its mouth lifted up from the arm of electrode 62.

The section 12 carrying lead-wire 38 and grommet 30 is then placed on arm 62 adjacent support 64 and tab 20 is laid up the side of the support and over its top. Tab 20 is thin enough to be readily folded and once folded will retain its folded shape and tend to stay in position. The can 10 is then slipped over the support as illustrated and the lower electrode 62 is ready for the welding.

The upper electrode 61 is prepared for welding by clamping in it the terminal lead-wire 24, which can be identical to that shown in 38 complete with enlarged head 74, the head 74 facing the outer surface of the can wall 21. An apertured support 66 can also be used with electrode 61 so as to hold head 74 at a predetermined distance with respect to electrode arm 62.

The welding operation of FIGURE 3 can then be carried out and will simultaneously weld tab 20 to the inside surface and lead-wire 24 to the outside surface of wall 21. The lead-wire 24 can then be unclamped and the welded assembly removed from the welding apparatus.

The assembly is completed by inserting section 12 along with grommet 30 into the can 10 and then roll and crimp the can into sealing engagement with the grommet. The insertion of the section will automatically cause the tab 20 to fold in the accordion-like manner indicated in FIGURE 1.

The capacitor section 12 may be impregnated with electrolyte by conventional impregnation processes prior to welding of tab 20 to the can wall 21. Any impregnant that adheres to the tab is removed during the welding procedure set forth above, so that no special protective coatings are required during impregnation. If desired, an electrolyte impregnant can be placed in can 10 before section 12 is inserted, or the assembly can be impregnated with vacuum-type impregnation even after the final assembly but before sealing.

Where a capacitor is of the electrolytic type it is advisable to avoid, as much as possible, introducing any impurities such as copper into the portions that are contacted by the electrolyte. To this end the support 64 should have its upper tip made of tungsten or a tungsten alloy such as RWMA specification class 13 group B. The balance of the support, which can be made of copper, is advisably also covered with phenol-formaldehyde resin or other insulations to keep it from contacting or rubbing off on the capacitor elements.

All other spot welding electrode portions can be made of copper, but tungsten or similar tungsten alloys will help there also since they reduce wear as well as sticking. The joint between lead-wire 38 and riser 16, as seen from FIGURE 1, is outside the can 21 and the portions of riser 16 that are clamped in arm 41 are only engaged by grommet 30. These portions are accordingly sufficiently protected from the electrolyte so that a slight copper contamination introduced by the welding does no harm.

The capacitors of the present invention show very little tendency to generate noise or develop intermittent open circuits even though one of the foils of section 12 is clamped in a split riser and the other is staked to tab 20. In fact, the staking of a foil no more than 5 mils thick to a tab of about the same thickness, when carried out at a pressure of from 10,000 to 50,000 pounds per square inch, provides a joint that appears to be cold welded. A similar good joint is made by the crimping of the split riser against the other foil, but here a spot welded joint can be used for the utmost in reliability, especially where the foil is an oxide-covered anode. Spot welding can also take the place of the staking of tab 20 if desired, but even without this hot welding the capacitor behaves like an all welded component.

Where the capacitor uses the outer surface of its housing 10 for a terminal lead, as by frictional engagement to a circuit element, the lead 24 can be omitted. The capacitor can also have its riser 16 used to similarly make frictional connections in a desired circuit so that lead 38 can be omitted. In this modification, riser 16 preferably extends at least 1/2 inch or so beyond the outer face of grommet 30, and should be made rigid enough to properly withstand frictional engagement. However, the welded joint between tab 20 and can 10 provides an arrangement of outstanding desirability.

The construction of the present invention can be used with non-electrolytic type of capacitor where the impregnation need only be used to reduce corona problems. With non-electrolytic capacitors the housing 10 can be of any desired metal including steel and brass in addition to aluminum.

For electrolytic capacitors, the housing 10 should have at least its inner surface of such character that it is compatible with the electrolytes; that is, a surface that does not deteriorate and is not attacked by the electrolytes. Aluminum, tantalum and silver make good surfaces for this purpose. However, the can need not be of uniform composition, but can have a multi-layered wall, as shown in FIGURE 4, where only the inner layer meets the above requirements. Such laminated wall construction is readily provided by merely having a plurality of cans dimensioned so that one fits or nests inside of another and the internal one provides the desired inert characteristics. The welding of joint 22 with or without joint 26 will then automatically weld the corresponding portions of the nested cans together as at 29.

The method of this invention is particularly suited for miniature types of capacitors, for example those having an overall housing diameter of less than 1/2 inch and overall height of less than 1 inch. The method has been successfully used in constructions having an outer can diameter of 3/16 inch and an overall length of 1/2 inch.

Obviously many modifications and variations of the present invention are possible in the light of the above teachings. It is, therefore, to be understood that within the scope of the appended claims the invention may be practiced otherwise than as specifically described.

What is claimed is:

A method of assembling a capacitor characterized by the steps of providing a capacitance unit having an elongated outwardly extending tab, inserting an end of said tab into a metal can that is a close fit for the unit, said can having one end closed and one end open, positioning a portion of the tab against the inner surface of the closed end, positioning an external lead against the outer surface of the closed end, simultaneously welding both tab and lead in place, inserting the unit into the can and simultaneously folding up the tab, and then sealing the open end of the can.

References Cited by the Examiner

UNITED STATES PATENTS

| | | | |
|---|---|---|---|
| 2,279,316 | 4/1942 | Herzog | 219—117 |
| 2,560,678 | 7/1951 | Wirt | 219—117 |
| 2,602,872 | 7/1952 | Ziegler | 219—85 |
| 2,805,372 | 9/1957 | Schneider | 29—25.42 X |
| 2,288,530 | 5/1959 | Bell | 219—85 |
| 2,991,540 | 7/1961 | Gaut | 29—25.42 X |
| 3,132,238 | 5/1964 | Wiley | 219—117 |

RICHARD H. EANES, JR., *Primary Examiner.*